Figure 1:
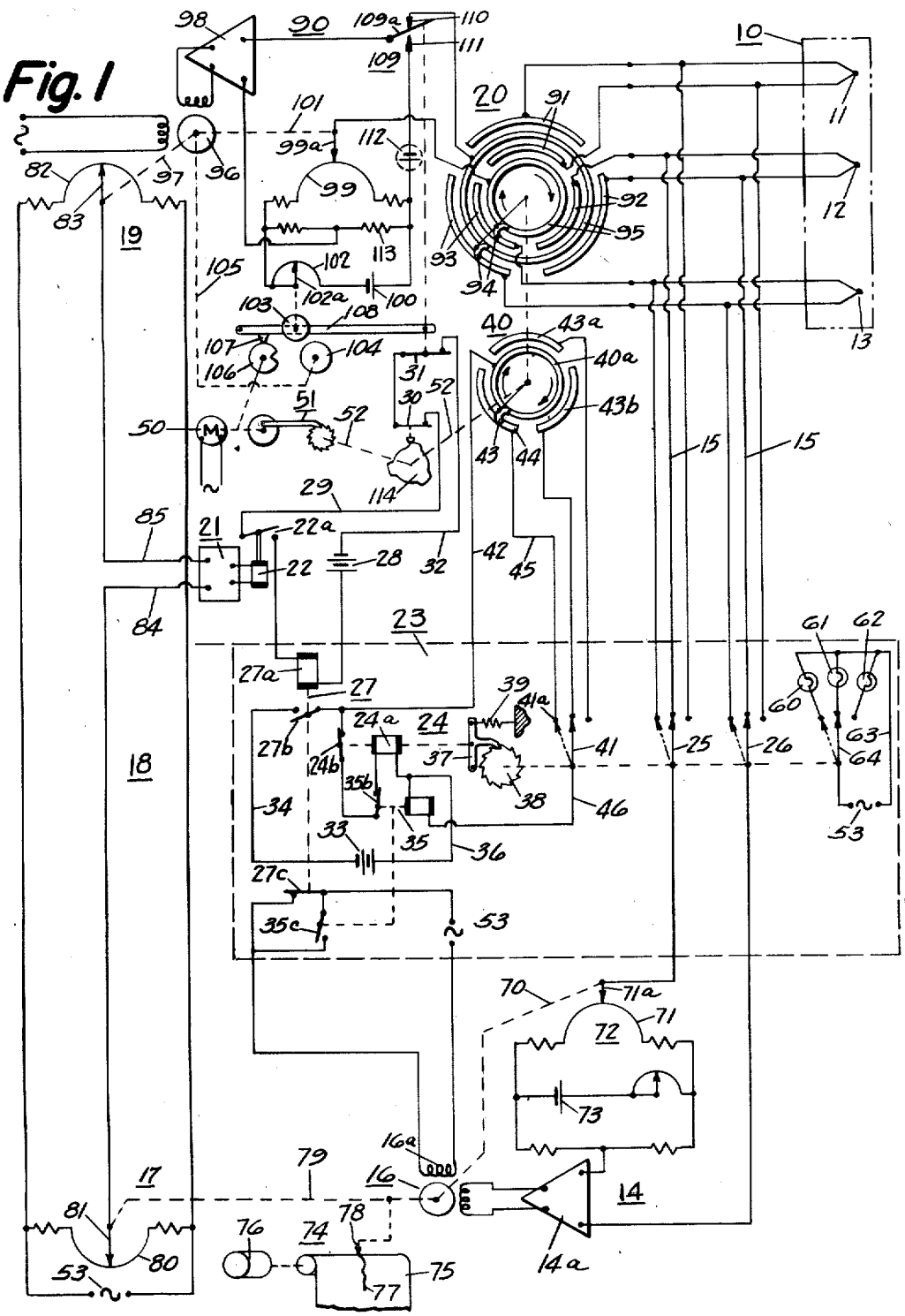

United States Patent Office 2,815,500
Patented Dec. 3, 1957

2,815,500

MONITORING SYSTEM FOR CONTINUOUSLY SELECTING EXTREME VARIABLES

Richard J. Hance, Burlington, and William J. Spengel, Haddonfield, N. J., and David Vandeventer, Philadelphia, and John L. Steinbright, Norristown, Pa., assignors to Leeds and Northrop Company, Philadelphia, Pa., a corporation of Pennsylvania Application December 14, 1955, Serial No. 553,037

20 Claims. (Cl. 340—213)

This invention relates to measuring and/or control systems of the type employing a plurality of condition-responsive elements and more particularly, to a system for selecting for measurement and/or control that one variable of a group of variables, as represented by the condition-responsive elements, which is most extreme in a given direction.

It is an object of the present invention to provide a system for comparing signals representative of the outputs of the condition-responsive elements while one of the condition-responsive elements being compared is simultaneously connected for measuring and/or control of the selected variable without interference with the aforesaid measuring and/or control.

In one aspect of the present invention, there is provided a system for selecting for measurement one varible of a group of variables having a magnitude which is most extreme in a predetermined direction and comprising a plurality of condition-responsive elements, each producing a signal representative of the magnitude of a variable of the group. A signal reproducing means is connected by way of a search means to one of the responsive elements. A comparator is connected to receive the output of the signal reproducing means and a signal from another responsive element by way of a selector means instantaneously to compare the magnitudes of the output and the signal. A detector connected to an output of the comparison circuit is responsive to produce a control signal when the magnitude of the signal produced by the other responsive element exceeds the signal produced by the one responsive element. The search means responsive to the control signal is operative to disconnect the signal reproducing means from the one responsive element and connect it to the other responsive element for continued measurement of its related variable until another variable attains a magnitude exceeding it.

In a preferred form of the present invention a single-point measuring and/or control system, while connected to a selected condition-responsive element or device continuously balanced and controlling a condition such as, for example, temperature of a previously selected hot point or cold point, positions the reference voltage point of a control bridge network in accordance with the temperature balance. A multi-point recorder, while sequentially monitoring all the conditions or temperatures in the system, positions a comparison voltage point of the same control bridge. When the multiple-point recorder balances to a temperature in excess of that of the single-point recorder, the control bridge is unbalanced to produce a control signal. The control signal is detected by an electronic relay which functions to operate to energize a search unit. The search unit makes circuit connection with the condition-responsive element associated with the veriable which is most extreme in a given direction. Simultaneously the search unit operates to transfer the input circuit of the single-point measuring system to the aforesaid variable. The system control is accordingly transferred to a newly selected condition-responsive element or device whose output is now the new reference point for successive operation.

In the preferred form of the present invention, there is provided, in a system for selecting for measurement one variable of a group of variables having a magnitude which is most extreme in a predetermined direction a stepping switch, comprising a first switch means, energized upon production of the control signal, to sequentially connect one of the condition-responsive elements to the measuring and/or control system. Another switch is operated in synchronism with the stepping switch for deenergizing the operation of the stepping switch when it is connected to the selected one of the other of the condition-responsive elements.

Further in accordance with the present invention, there is provided a means for disabling the operation of the first switch means during the time interval between comparisons by the comparator.

Figure 2:
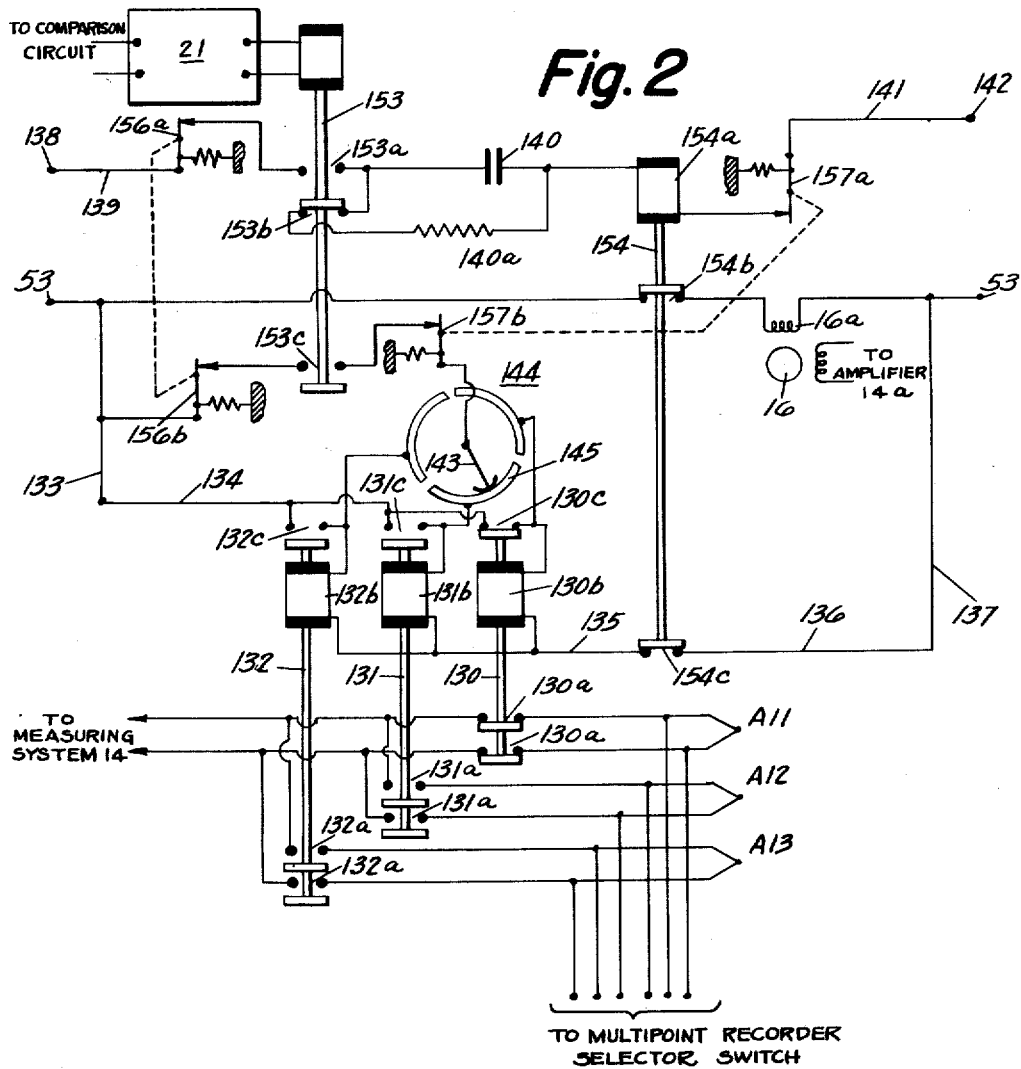
Figure 3:
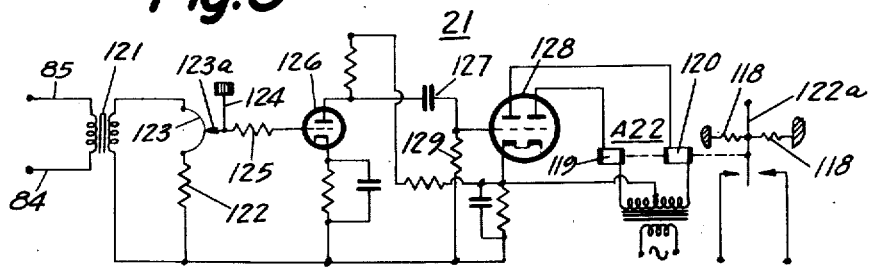

For other objects and advantages of the present invention, reference may be had to the following detailed description taken in conjunction with the accompanying drawings in which:

Fig. 1 schematically illustrates a control system embodying the present invention;

Fig. 2 schematically illustrates a modification of the selecting arrangement operable with the control system of Fig. 1; and Fig. 3 schematically illustrates a detector suitable for use in the arrangement of Fig. 1.

Referring to Fig. 1 as exemplary of a monitoring system embodying the invention, the thermocouples 11—13 are condition-responsive devices respectively producing output signal voltages corresponding with the temperatures within an apparatus 10, such as a furnace, to which they are exposed. A switching arrangement 23 serves as a search means for connecting a selected one of the thermocouples to a measuring means 14 which may record and/or control the temperatures to which the thermocouples respond. The measuring means 14 produces a reference signal representative of the output signal of the selected one of the thermocouples and such signal is applied to a comparator means 18. A selector means 20 sequentially applies signals from the thermocouples to the comparator means 18 for comparison of each of them with the reference signal from the measuring means. A detector means 21, responsive to the output of the comparator, operates the search means 23 to connect another thermocouple to the measuring means 14 in event its signal is greater, in a predetermined direction, than the reference signal. Thus the measuring means is continuously connected, during the comparison to the selected thermocouple for continuous monitoring of the most extreme temperature, either high or low, to which the group of thermocouples is exposed.

During the course of comparison between outputs of the thermocouples, the control of the system, in accordance with the selected thermocouple, is unaffected. This feature is of importance when it is considered that a change in the selected thermocouple connected for control puproses may not be effected for a substantial period of time. Hence, the present invention provides with a minimum number of condition-responsive devices a system affording conditions control of the process without interruption of the control during comparison stages.

The thermocopule 12 being initially selected for control purposes is connected to the input of a single-point measuring system 14 by way of lead wires 15. The system 14, which may be of the type illustrated and described in Williams Patent 2,113,164, includes a balancing motor 16.

When the relay 24 of search unit 23 is initially energized its armature is moved to the left pulling a pawl 37 away from ratchet 38. The movement of the armature of the relay 24 opens contacts 24b, thus breaking the energizing circuit for the relay. The pawl 37 is moved back to its initial position by spring 39 and in so doing engages a toothed portion of the ratchet 38 to move the ratchet and the mechanically connected contacts 25 and 26 in a single step. Such operation of the relay 24 continues until contacts 25 and 26 have been moved to positions shown in dotted lines, whereupon the search unit 23 has connected the newly selected thermocouple 13 to the input of the measuring and/or control system 14.

When the selected thermocouple 13 has been connected to the input of the measuring and control system 14 the search unit is automatically deenergized, the thermocouple 13 will remain connected to the measuring and control system 14 as a reference for successive operation and control of the process being carried out in the apparatus 10 until, for example, another thermocouple output becomes greater than the output of thermocouple 13. A controller (not shown) for the process within apparatus 10 may be similar to that of Davis Patent 2,666,170. The rotary position of the motor 16, representative of the measured magnitude of the thermocouple or condition-responsive element 13 is transmitted as a signal to a first input 17 of a comparator or bridge 18. The comparator or comparison network 18 has applied to a second input 19 thereof, in successive order, signals representative of the instantaneous magnitudes of the conditions and of the condition sensitive elements, or thermocouples, 11—13. Signals are applied to the second input by sequential connection of the thermocouples by way of a selector or switching mechanism 20. As illustrated, the thermocouple 13 is connected for production of a signal representative of its output for application to the second input 19 in a manner hereinafter described.

When the magnitude of the signal applied to the second input 19 of the comparison network 18 is in excess, in a predetermined direction, of the magnitude of the signal applied to the first input 17, such condition being representative of the thermocouple 13 having an output in excess of the output of thermocouple 12, the network 18 becomes unbalanced and produces a signal to which a detector 21 responds to operate a relay 22 included in an output circuit thereof. The operation of the relay 22 initiates the operation of search unit 23 whose stepping relay 24 as above described, steps contacts 25, 26 to doted line positions to disconnect the thermocouple 12 from and connect the thermocouple 13 to the input of the measuring system 14. The system control is thereby transferred to the newly selected thermocouple 13 and the temperature which that thermocouple measures is now the new reference point for successive operation of the system.

It is to be noted that the input of the measuring and/or control circuit 14 is isolated from the comparison network 18 and, accordingly, the comparison of successive thermocouples may go on without interruption of or interference with the normal operation of the measuring and/or control system.

Each time the comparison network 18 becomes unbalanced, in the manner above described, the search unit 23 is energized to connect the measuring and control system 14 to a newly selected thermocouple or condition-responsive element in a manner now to be described. When the detector 21 responds to an unbalanced signal from the comparison circuit 18 the relay 22 is energized to close its contact 22a and complete an energizing circuit for a control relay 27 which may be traced from the lower side of battery 28 by way of the operating coil 27a of the relay 27, closed contacts 22a, conductor 29, the closed contacts of switch 30, the contacts of switch 31, conductor 32 and thence to the other side of the battery 28. The energization of relay 27 causes it to close its contacts 27b to effect the immediate operation of the stepping relay 24 to cause the disconnection of the previously selected thermocouple 12 from and the connection of the newly selected thermocouple 13 to the input of the measuring and control system 14. The stepping relay 24 includes an operating coil 24a which is energized upon the closure of contact 27b of the relay 27 to complete a circuit which may be traced from the left-hand side of battery 33 by way of conductor 34, contacts 27b, relay contacts 24b, relay contacts 35b, the operating coil 24a of the stepping relay, conductor 36 and back to the right-hand side of the battery 33.

The search unit 23 is deenergized by opening the energizing circuit for the relay 24 through operation of relay 35 and the opening of its contacts 35b under the control of a second switching device 40, a commutator type switch, which is operated in synchronous relation with the first switching device 20, and a movable contact 41 of the stepping relay 24. When during the course of hunting or stepping, the movable contact or wiping contact 41 engages fixed contact 41a, an energizing circuit for the relay 35 is completed and may be traced from one side of the operating coil of relay 35, conductor 36, battery 33, conductor 34, closed contacts 27b, conductor 42, continuous commutator ring 40a, contact 43, commutator segment 44, conductor 45, contacts 41a and 41, conductor 46 and then to the other side of the operating coil of relay 35. With connection of the thermocouple 13 to the input of the measuring system 14 the comparison circuit 18 is then brought to balance by reason of signals of equal magnitude being applied to its inputs 17, 19 and the relay 22 is deenergized in turn to effect the deenergization of the relay 27.

The relay 35 is deenergized to condition the search unit 23 for subsequent operation upon movement of the contact 43 to open the circuit between the ring 40a and the segment 43. The contact movement is continued during the subsequent operation of the system so that it will sequentially bridge the ring 40a with the other segments 43a and 43b, and, in so doing, prepare for operation once again the relay 35 when the search unit has sought out and connected another one of the thermocouples to the measuring circuit 14. For example, with the contact 43 in position to bridge the ring 40a and the segment 43a the relay 35 will be energized should thermocouple 11 have an output exceeding that of the thermocouple 13. Likewise, when thermocouple 12 is once more being compared with the thermocouple 13, the contact 43 will be in a position to bridge the ring 40a and the segment 43b to energize the relay 35 and automatically interrupt the operation of the search unit when connection is made between the input of the measuring system 14 and the thermocouple 12.

Movement of the contact 43 of commutator switch 40 may be effected in any well-known manner. As illustrated, the contact 43 is driven in a stepping manner from a synchronous motor 50 by way of a pawl and ratchet arrangement 51 and shaft 52.

During the searching operation of the stepping relay 24, there is provided means for disconnecting the line winding 16a of the balance motor 16 from its source of A. C. supply 53. Such means is provided by contact 27c of relay 27 operated to open-circuit the winding 16a upon energization of the relay 27 in order to prevent system 14 from measuring the temperatures of the thermocouples temporarily connected by the stepping switch during the hunting operation and thus preclude disturbance of any associated control. Further, in order that the energization of the line winding 16a be reestablished as soon as possible after the connection of a newly selected thermocouple, which in the operation above described is the thermocouple 13, there is provided a second normally open relay contact 35c. The contact 35c is closed immediately upon the energization of the relay 35 which takes place at the moment the thermocouple 13 is connected to the input of the measuring system 14. Upon closure of switch 35, the energizing circuit for the line winding 16a of motor 16 is reestablished and control of the process and measuring of the magnitude of the temperature thereof continues in accordance with the output of the newly selected thermocouple 13. Soon after connection of thermocouple 13 to the measuring circuit 14 the comparison circuit 18 is brought to balance and relay 27 deenergized to reclose contact 27c.

With the thermocouple 13 connected to the input of the measuring system 14 the relay 27 will again be energized at such time as when another of the thermocouples or condition-responsive elements 11, 12 exceeds in a predetermined direction the output of thermocouple 13.

A visual indication may be afforded an operator of the identity of the condition-responsive element connected for control purposes to the system 14. Such an indicating arrangement may be comprised of lamps 60—62 having one side respectively connected to fixed contacts of the stepping relay or switch 24 of search unit 23 and the other side connected by way of conductor 63 to one side of A. C. supply 53. The lamps 60—62 are selectively energized when the movable contact 64, ganged on a common shaft with contacts 25 and 26, engages one of the aforesaid fixed contacts to connect the selected lamp to the other side of the A. C. supply.

Upon continued operation of the system, should condition-responsive element or thermocouple 12 once again be selected as a reference for control purposes its output is introduced to the measuring system 14 as an unbalance signal which causes an adjustment in the position of the balance motor 16. The balance motor 16 is mechanically connected by shaft 70, shown in dotted lines, to a relatively movable contact 71a of a slide wire 71. The movement or adjustment of the balance motor and the contact 71a is in a direction to increase or decrease the potential produced by the potentiometer 72 supplied by battery 73 to introduce a potential of magnitude equal and opposite to the output of the connected thermocouple. When the input signal to amplifier 14a, which may be of the type shown in Williams Patent 2,113,164, has thus been reduced to zero, the position of the slide wire 71 and the shaft position of the motor 16 are representative of the instantaneous magnitude of the condition or temperature as represented by the output of the connected thermocouple. A record of temperature magnitude may be had by way of a chart type recorder 74 which may be of the type illustrated and described in Ross et al. Patent 2,074,118. Such a recorder includes a chart 75 driven by means of a synchronous motor 76. The record of temperature magnitude as represented by line 77 is imprinted on the chart by way of a suitable pen or printing mechanism 78.

The rotor position of the motor 16 is representative of the magnitude of the variable being measured. Hence, the measuring system may be said to be a signal generating device which produces a signal in response to the output of the connected thermocouple representative of the magnitude of the condition being measured.

In accordance with the present invention, the signal produced by the measuring system 14 is, in the illustrated embodiment, mechanically transmitted from the motor 16 by way of a shaft 79 represented by dotted lines, to the first input 17 of the comparison or bridge circuit 18. The first input is provided by a slidewire 80 having a relatively movable contact 81. Although the contact has been illustrated as being movable, it will be understood that the contact may be fixed and the slidewire 80 made movable. The relative position between the slidewire 80 and the contact 81 is representative of the instantaneous magnitude of the variable or condition as measured by the system 14.

The comparison circuit 18 may be of any suitable type including the D. C. type of bridge and input signals applied thereto may be, as above described, by adjustment of an impedance in the bridge or by introduction of an electric signal. Preferably, the comparison circuit is an A. C. bridge energized from a suitable source of supply represented by A. C. supply terminals 53 and having the first input 17 comprised of the slidewire 80 having a relatively movable contact 81 and the second input 19 comprised of a slidewire 82 having a relatively movable contact 83.

The comparison circuit or network 18 is at balance when the movable contacts 81 and 83 are at the same point with regard to their respective slidewires 80 and 82. Should the comparison network 18 become unbalanced as by adjustment of the movable contact 83 relative to its slidewire 82 a signal will be applied to the detector 21 by way of conductors 85 and 84 to initiate operation of the search unit 23 for ultimate connection of a new thermocouple to the input of the measuring system 14.

Where an A. C. type bridge is employed as a comparison circuit, as in the illustrated embodiment, the contact 83 is adjusted by operation of a transducer 90 which translates the electrical signals from the condition-responsive elements or thermocouples 11—13 into mechanical signals adjusting the position of the contact. The thermocouples 11—13 are connected to associated pairs of commutator segments 91—93 and their outputs individually and sequentially applied to the transducer 90 as contacts 94 of the switching mechanism 20 bridge the pair of segments 91—93 to continuous rings 95 in turn electrically connected to the transducer 90. The contacts 94 are moved synchronously with contact 43 of switch 40 by mounting them on common shaft 52.

In accordance with the present invention, signals representative of the outputs of the various thermocouples 11—13 are continuous and are sequentially compared with a signal representative of the output of the selected thermocouple, in this instance thermocouple 12, to determine if the output of any of them exceeds the output of the selected thermocouple in a predetermined direction. Signals representative of the outputs of the thermocouples 11—13 are sequentially applied for ultimate application to the second input 19 of the comparison circuit 18 by way of a switching device 20 which is illustrated to be of the commutating switch type.

Where it is desired to maintain a record of the temperature to which each of the thermocouples 11—13 is exposed, the transducer 90 may be, as illustrated, a second measuring system of the multi-point type shown in Ross et al. Patent 2,113,069 sequentially receiving in its input by way of switch 20 output signals from the thermocouples 11—13. The output of the measuring system 90 includes a balance motor 96 connected mechanically as illustrated by the dotted line 97 to the relatively movable contact 83 of slidewire 82. The measuring system 90 may also include a recorder of the type shown in the aforesaid Ross et al. patent and in which case the recorder (not shown) would have a mechanical connection to the rotor of the balance motor 96.

The operation of the measuring system 90 is basically similar to that of system 14. The signal produced by the thermocouple is applied to the input of amplifier 98 which may be of the same type as amplifier 14a. The input circuit includes a potentiometer comprised of slidewire 99 and battery 100, and the applied signal causes an adjustment between the slidewire 99 and its contact 99a by way of balance motor 96 through a mechanical connection illustrated by dotted lines 101. The adjustment of the potentiometer introduces a signal to the input of the amplifier 98 equal and opposite to that of the thermocouple signal to bring the system to balance, i. e. a reduction of the amplifier input signal to zero.

The adjustment of motor 96 simultaneously introduces to the second input 19 of the comparison circuit 18 as by adjustment of contact 83 a signal representative of the magnitude of the variable, in this instance, temperature, associated with the thermocouple 13. The signals applied to the inputs of the comparison circuit 18 are compared without interruption of the measuring and/or control function of system 14, and should the thermocouple register a higher output than the output of thermocouple 12, the search unit will be energized to select thermocouple 13 as the new reference for measuring and/or control.

In measuring systems, it is desirable that there be provided a means for standardizing the battery which forms part of the potentiometer of the measuring circuit. A suitable standardizing circuit has been illustrated in conjunction with the measuring system 90, it being understood that a similar system may be employed in conjunction with the measuring system 14 but here has not been added in order to avoid needless complexity in the illustration of the present invention. In the potentiometer circuit of the measuring network for system 90, the battery 100 produces a flow of current which in turn produces a potential drop across the slidewire 99. As the magnitude of current flow from the battery diminishes during the course of use, adjustment of a rheostat 102 in series with the battery 100 may be made in order to adjust the amount of current flowing through the slidewire 99 and bring it to a predetermined value. Such adjustment of the rheostat 102 may be done manually or automatically. In the present illustrated arrangement, automatic adjustment is afforded by way of a connection between a movable contact 102a of the rheostat and the balance motor 96 of the measuring system through a friction drive comprised of friction drive wheels 103—104 and a shaft 105 illustrated by dotted lines. Standardizing of the system and more particularly of the current from potentiometer battery 100 takes place periodically under the control of cam 106 driven by motor 50. A cam follower 107 mounted on a pivoted arm 108 follows the contour of cam 106 and when it reaches the depressed portion the arm 108 is dropped to effect engagement between the friction driving wheels and simultaneously to move a movable contact 109a of single-pole, double-throw switch 109 from contact 110 to a contact 111 thus disconnecting the thermocouple circuit and connecting a standard cell 112 in circuit with the potentiometer. The voltage introduced into the measuring or potentiometer network by the standard cell opposes that potential developed across the standardizing resistor 113 by flow of current from battery 100. If the potential developed across the standardizing resistor 113 is less or greater than the voltage of the standard cell, the difference voltage is introduced to the amplifier and the motor 96 is adjusted or energized for adjustment of the rheostat contact 102a in a direction to bring the potential drop across the resistor 113 to a value equal to the voltage of the standard cell.

During the time that standardization is taking place, it is desirable to disable the selecting system so that the adjustment of the balance motor 96 in accordance with difference between the potential of the standardizing cell 112 and the potential across resistor 113 does not introduce a false signal to the input 19 of the comparison circuit 18, and thus effect a false operation of the selecting system. The disabling of the selecting system is had by means of the switch 31 whose contacts are in the energizing circuit for the relay 27 and are operated to an open position when standardizing begins by the pivoting of the arm 108 in a downward direction. Upon the completion of the standardizing cycle, the arm is raised to close the switch 31 and otherwise condition the energizing circuit of relay 27 for operation.

In further prevention of random operation of the search unit 23 there is provided another means for disabling the search unit for such period of time until the multi-point recorder 90 has been connected to one of the thermocouples and has come to an actual balance accurately positioning the contact 83 relative to the slidewire 82. Such means is provided by cam operated switch 30. The switch 30 is operated by a cam 114, having three raised cam surfaces, mounted on shaft 52 and thus driven at the same speed as the sliding contacts of switch arrangements 20 and 40. The timing of the cam operated switch 30 is such that it will be closed when the multi-point recorder 90 attains actual balance, thus conditioning the relay 27 for operation should an unbalance exist in the comparison circuit 18. At other times the switch 30 is open thus disabling the energizing circuit for relay 27 while the switching unit 20 is in operation to connect another thermocouple to the multi-point recorder and while the multi-point recorder is coming to actual balance.

The control or selecting system embodying the present invention is arranged so that the control of the temperature of the tower or apparatus 10 is at all times connected to that thermocouple whose output exceeds the outputs of the other thermocouples in a predetermined direction. In the present arrangement, the system is arranged to select the thermocouple which registers the highest temperature. However, the system may also be connected to select the thermocouple registering the lowest temperature if such operation is desired. The mode of operation, i. e. either selection of the hottest point or the coldest point may be the function of a detector 21 connected between contacts 81 and 83 of the comparison circuit 18. A suitable detector and circuit will be described specifically hereinafter.

A suitable detector arrangement is illustrated in Fig. 3 as comprised of the phase detector 21. The phase detector 21 is similar to that shown and described in Patent 2,743,097 which issued upon copending application, Serial No. 376,510, filed August 25, 1953, by Carolus and Cranch, co-employees of ours. The input circuit for the detector is connected to conductors 85 and 84 which are connected to a primary winding of a transformer 121 of the high impedance type. The secondary winding of the transformer 121 is connected across a resistor 122 and a slidewire 123, and a movable contact 123a which is adjustable by knob 124. The voltage appearing across the lower portion of slidewire 123 and resistor 122 is applied by way of a grid resistor 125 to the input circuit of vacuum tube 126. The input signal is amplified and applied by way of coupling capacitor 127 to the grids of a double triode 128. The grids for each triode have been illustrated as internally connected together and to a grid-leak resistor 129. The anodes are respectively connected to windings 119 and 120 of relay A22, one of which operates the movable contact of the single-pole, double-throw switch 122a against one stationary contact and the other coil operates it against the other stationary contact. When neither coil is energized, centering springs 118 maintain the movable contact in an intermediate position and in spaced relation with both stationary contacts.

When zero potential difference appears at the input terminals of transformer 121, the output from tube 128 is zero. However, when a potential difference between contacts 81 and 83 of Fig. 1 appears, one or the other of the triode sections of tube 128 will be rendered conductive depending upon the phase relation between the input signal and the alternating current applied to the respective anodes. Thus, if the phase is in one direction, the left-hand triode will be rendered conductive to energize coil 119 to operate the switch 122a to complete a circuit with one of its fixed contacts. Upon 180° reversal of phase, the other or right-hand section will become conductive for energization of coil winding 120 to operate the movable contact against the other stationary contact. In this way, by proper selection of the contacts of switch 122a for the system, it will be possible with the given detector to operate the system for the selection of either the highest valued output from the thermocouples, i. e. in determination of hot spots, or in the determination of cold spots. As illustrated (Fig. 1), the system is arranged for detection of the thermocouple having the highest output, i. e. the thermocouple exposed to the highest temperature.

Now that one complete embodiment of the present invention has been illustrated and described, it is apparent that the system is subject to modification within the scope of the present invention. One possible modification is illustrated in Fig. 2 wherein a relay-type selecting circuit has been embodied in the system in place of the stepping switch arrangement illustrated in Fig. 1. In the arrangement of Fig. 2, as in Fig 1, there are provided a plurality of thermocouples A11, A12 and A13 equal in number to the points whose temperature is to be measured. Each of the thermocouples A11, A12 and A13 is connected by way of its respective conductors to a selector switch of the commutator type illustrated in Fig. 1 as the switching device 20. In addition, each of the thermocouples is adapted to be selectively connected to a measuring and control system of the type identified as 14 in Fig. 1 by way of relay operated contacts 130a, 131a and 132a. The relay contacts 130a—132a are respectively operated to open and closed positions by operating coils 130b—132b of relays 130—132. As illustrated, the thermocouple A11 is connected by way of the closed contacts 130a to measuring system 14 through energization of the relay 130 held in an energized state through its back contacts 130c in a circuit that may be traced from supply line 133, conductor 134, back contacts 130c, the operating coil 130b, conductor 135, contacts 154c, conductor 136, and the other supply line 137.

Now assuming that one of the other thermocouples, namely A12 or A13, has an output which exceds in a predetermined direction the output of the thermocouple A11, there will be introduced to the detector 21 a signal which causes the detector to respond to energize relay 153 and to close contacts 153a. Closure of the contacts 153a completes an energizing circuit for relay 154 which may be traced from direct-current supply line 138, conductor 139, switch 156a, contacts 153a, capacitor 140, and operating coil 154a of relay 154, switch 157a, conductor 141, and thence to the other supply line 142. The operation of relay 154 causes the contacts 154b and 154c to open to effect two functions: first, the energizing circuit for the line winding 16a of balance motor 16 is deenergized or opened to prevent errors being introduced to the control system during the switching operation, that is, switching from one of the condition-responsive elements to another of the condition-responsive elements; secondly, the opening of contact 154c deenergizes the relay 130 and opens contacts 130a. The system is now conditioned for the selection of the thermocouple whose output is most extreme in a predetermined direction. The operation of the relay 153 causes a closure of contacts 153c to complete an energizing circuit for relay 131 associated with thermocouple A12 which is the thermocouple whose output is most extreme. The energizing circuit may be traced from the supply line 133, switch 156b, contacts 153c, switch 157b, the movable contact 143 of commutator switch 144, commutator segment 145, the operating coil 131b of relay 131, conductor 135, contacts 154c, conductor 136 and the other supply line 137.

The contacts 154c are closed to complete the energization of relay 131 even though the relay 153 is still energized by the presence of a capacitor 140 which after a short period of time following the closure of contacts 153a charges up and thus presents an effective open circuit in the direct-current path of the energizing circuit for the relay 154. Hence, soon after being energized, the relay 154 is deenergized so that the switch 154c is closed to permit the operation of the relay 131. Upon connection of the new thermocouple A12 to the measuring system 14, the comparison circuit is brought to a balance and the relay 153 is deenergized. The relay 131 is held energized despite the opening of contact 153c by way of an energizing circuit which may be traced from supply line 133, conductor 134, back contacts 131c, the operating coil 131b of the relay 131, conductor 135, contacts 154c, conductor 136 and the other supply line 137.

Upon the opening of contacts 153a and closing of contacts 153b, the condenser 140 discharges through resistor 140a to condition the energizing circuit of relay 154 for operation upon occurrence of a point whose temperature is more extreme in a given direction than the temperature of the point being measured by the thermocouple A12.

Like the system of Fig. 1, the modification of Fig. 2 includes means for disabling the selecting system during the time that the multi-point measuring system 40 (Fig. 1) is being standardized and also during the time that the measuring system is unbalanced; the latter time including that period when contacts 94 of the switching device 20 are disposed over the open areas between adjacent commutator segments. Disabling of the system of Fig. 2 during the standardizing operation is effected by way of interrupters or switches 157a and 157b, having their movable contacts mechanically connected and operated in a manner similar to the operation of the interrupter or switch 31 (Fig. 1). The interrupters 157a and 157b cooperate to prevent, during the standardizing operation, a change in the thermocouple selected for control purposes and also to prevent the connection of more than one thermocouple at a given time to the input of the measuring and control circuit. The interrupter 157a is moved to an open position upon the initiation of standardizing to open-circuit the energizing circuit of relay 154 and thus avoid, as by opening of contact 154c, the disconnection of a selected thermocouple. The other interrupter 157b opens the circuit through the commutator switch 144 which, in the position indicated, would otherwise cause the energization of relay 131 to connect thermocouple A12 in parallel with thermocouple A11. Such energization of the relay 131 could take place in the absence of the open circuit provided by the interrupter 157b by way of a circuit which may be traced from supply line 133, interrupter 156b, closed contacts 153c, wiping contact 143 of switch 144, commutator segment 145, operating coil 131, conductor 135, contacts 154c, conductor 136 and the other supply lines 137.

Interrupters or switches 156a and 156b perform identical functions to those of interrupters 157a and 157b to prevent false operation of the selecting system during time periods between attainment of final balance on successive points by the multi-point measuring system 90.

What is claimed is:

1. A circuit for selecting for measurement that one variable of a group of variables having a value which is most extreme in a predetermined direction comprising a plurality of sensitive elements equal in number to the variables of said group and each producing an electrical effect in accordance with its associated variable, a comparison circuit having first and second inputs, signal generating means, switching means for selectively connecting one of said sensitive elements to said signal generating means for generation of a signal representative of the output of a selected one of said sensitive elements, means for applying said signal to said first input, means for sequentially connecting said sensitive elements for separate application to said second input of signals each representative of the output of an associated one of said sensitive elements, said comparison circuit being responsive to produce a control signal when the signal representative of the output of one of said sequentially connected sensitive elements exceeds said generated signal in a predetermined direction, and means responsive to said control signal for operating said switching means to disconnect said selected sensitive element and said signal generating means and to connect the other sensitive element and said signal generating means for continued generation of a signal representative of the output of said other sensitive element until the magnitude of one of the other sensitive elements exceeds it.

2. A system for selecting for measurement one variable of a group of variables having a magnitude which is most extreme in a predetermined direction comprising condition-responsive elements each producing an electrical signal representative of the magnitude of a variable of said group, a first measuring means, first switch means for connecting said measuring means to a one of said responsive elements, a second measuring means, second switch means operative sequentially to connect said responsive elements to said second measuring means, a comparison circuit having two inputs respectively connected to said first and said second measuring means for instantaneously comparing the measured magnitudes of signals produced by said one of said responsive elements and another of said responsive elements, a detector connected to an output of said comparison circuit and responsive to produce a control signal when the magnitude of the signal of said other responsive element connected to said second measuring means exceeds the signal produced by said one responsive element connected to said first measuring means, and means responsive to said control signal for operating said first switch to connect said first measuring means to said other element for continued measurement of its related variable until another variable attains a magnitude exceeding it.

3. A system for selecting for measurement one variable of a group of variables having a magnitude which is most extreme in a predetermined direction comprising condition-responsive elements, each producing an electrical signal representative of the magnitude of a variable of said group, a first measuring means, first switch means for connecting said measuring means to one of said responsive elements, a second measuring means, second switch means for sequentially connecting said responsive elements to said second measuring means, a comparison circuit having two inputs respectively connected to said first and said second measuring means for instantaneously comparing the measured magnitudes of signals produced by said one of said responsive elements and another of said responsive elements, and a detector connected to an output of said comparison circuit and responsive to produce a control signal when the magnitude of the signal of said other element connected to said second measuring means exceeds the signal produced by said one responsive element connected to said first measuring means, said second switch means being energized upon production of said control signal to connect said first measuring means to the other of said responsive elements.

4. The system of claim 3 in whihc said first switch means comprises a stepping switch energized upon production of said control signal to sequentially connect with said condition-responsive elements, and a third switch means operated in synchronism with said second switch means for deenergizing said stepping switch means when said stepping switch means is connected to the other of said condition-responsive elements.

5. The system of claim 3 in which there is provided means for disabling the operation of said second switch means during the time interval between connection of successive condition-responsive elements by said first switch means.

6. The system of claim 3 in which there is provided means for disabling the operation of said first switch means during the time interval between connection of successive condition-responsive elements by said second switch means.

7. The system as in claim 3 in which said second switch means comprises a plurality of relays each associated with one of said condition-responsive elements, and a third switch means synchronously operable with said first switch means for energization upon production of said control signal of the one of said relays associated with said condition-responsive element connected to said second measuring means for connection of said condition-responsive element to said first measuring means.

8. The system as in claim 7 in which there is provided a means operable upon production of said control signal for opening the energizing circuit for said relays and to close said energizing circuit to condition said relays for selective energization of said third switch means.

9. An arrangement for selecting that one variable of a group of variables having a value which is most extreme in a predetermined direction comprising a plurality of sensitive elements, each producing an electrical effect representative of the value of a variable of said group, a comparison circuit, means for applying to said comparison circuit signals representative of the electrical effects produced by two of said sensitive elements, a detector having its input connected to said comparison circuit and responsive to a difference signal between the magnitudes of the electrical signals applied to said comparison circuit, one of said element-connecting means comprising a stepping switch providing the electrical connection for the application of said signal representative of the electrical effect of one of said elements to said comparison circuit, the other of said connecting means comprising a first commutating means continuously operable to sequentially apply signals representative of the electrical effects of each of said sensitive elements to said comparison circuit for comparison of the magnitude of its electrical effect with that of the electrical effect of the other sensitive element whose representative signal is applied by said stepping switch means, said detector being operable when the signal applied by way of said first commutating means is more extreme in value than that applied by said stepping switch means to energize said stepping switch means for sequential connection to said elements, and a second commutating means synchronized with said first commutating means and operable to complete a circuit for deenergizing said stepping switch means when the element connected to said stepping switch is the same as that connected by said first commutating means, thereby to select the sensitive element associated with the extreme variable.

10. An arrangement for selecting for measurement that one variable of a group of variables having a value which is most extreme in a predetermined direction comprising a plurality of sensitive elements each producing an electrical effect representative of the magnitude of a variable of said group, a measuring means, stepping switch means for connecting the sensitive element associated with one of said variables to said measuring means for production of a signal representative of the electrical effect produced by said element, a second measuring means, first commutating means for sequentially connecting each of said sensitive elements to said second measuring means for production of electrical signals representative of the electrical effects produced by said sensitive elements, a comparison circuit for comparing the magnitude of the electrical signals produced by said first and second measuring means, a detector having its input connected to said comparison circuit and responsive to a difference signal produced when said signal generated by said second measuring means exceeds the signal produced by said first measuring means, said stepping switch means being responsive to said signal produced by said detector for sequentially connecting said elements to said first measuring means, and means including a second commutating means synchronized with said first commutating means for deenergizing said stepping switch means when said stepping switch means has connected said first measuring means to said element connected to said second measuring means.

11. A circuit for selecting for measurement that one variable of a group of variables having a value which is most extreme in a predetermined direction comprising a plurality of sensitive elements equal in number to the variables of said group and each producing an electrical effect in accordance with its associated variable, a comparison circuit having first and second inputs, signal generating means, switching means for selectively connecting one of said sensitive elements to said signal generating means for generation of a signal representative of the output of a selected one of said sensitive elements, means for applying said signal to said first input, means sequentially connecting said sensitive elements for separate application to said second input of signals each representative of the output of an associated one of said sensitive elements, said comparison circuit being responsive to produce a control signal when the signal representative of the output of one of said sequentially connected sensitive elements exceeds said generated signal in a predetermined direction, and means responsive to said control signal for operating said switching means to disconnect said selected sensitive element and said signal generating means and to connect the other sensitive element and said signal generating means for continued generation of a signal representative of the output of said other sensitive element until the magnitude of one of the other sensitive elements exceeds it in a predetermined direction.

12. The circuit of claim 11 in which said switching means comprises a stepping switch which is energized upon production of said control signal to disconnect said selected sensitive element and to connect the other sensitive element.

13. The circuit of claim 11 in which said switch means includes a switching element operated in synchronism with said sequentially connecting means for deenergizing said switching means when said other sensitive element is connected to said signal generating means.

14. The circuit of claim 11 in which said switching means comprises a plurality of relay operated switches equal in number to said sensitive elements.

15. The circuit of claim 14 in which said switching means includes a switch operated in synchronism with said sequentially connecting means for selectively energizing one of said relays associated with the other sensitive element to connect said other sensitive element to said signal generating means.

16. The circuit of claim 11 in which said signal generating means is a measuring and control circuit having an output signal representative of the instantaneous value of the electrical effect produced by the sensitive element connected thereto.

17. The circuit of claim 16 in which there is provided means for deenergizing said measuring and control circuit during the time intervals between the successive connections of said sensitive elements to said second input of said comparison circuit.

18. The circuit of claim 12 in which said switching means also includes a third switch operated in synchronism with said sequentially connecting means for energizing said stepping switch when connection is made between the other sensitive element and said signal generating means.

19. The circuit of claim 18 in which a solenoid operates said stepping switch and a relay is energized by said third switch to deenergize the operating circuit of said solenoid to stop the operation of said stepping switch when said other sensitive element is connected to said signal generating means.

20. The circuit of claim 19 in which a second relay responsive to said control signal closes the operating circuit of said solenoid to begin operation of said stepping switch for ultimate connection of said other sensitive element with said signal generating means.

References Cited in the file of this patent

UNITED STATES PATENTS

| | | |
|---|---|---|
| 2,444,421 | Boston | July 6, 1948 |
| 2,549,401 | Stein et al. | Apr. 17, 1951 |
| 2,560,829 | Stewart | July 17, 1951 |

UNITED STATES PATENT OFFICE
CERTIFICATE OF CORRECTION

Patent No. 2,815,500                                December 3, 1957

Richard J. Hance et al.

It is hereby certified that error appears in the above numbered patent requiring correction and that the said Letters Patent should read as corrected below.

In the grant, lines 4 and 14, and in the heading to the printed specification, line 7, name of assignee, for "Leeds and Northrop Company", each occurrence, read -- Leeds and Northrup Company --; column 1, line 30, for "varible" read -- variable --; line 69, for "veriable" read -- variable --; column 2, line 53, after "comparison" insert a comma; line 62, for "puproses" read -- purposes --; line 65, for "conditions" read -- continuous --; same column 2, line 67, for "thermocopule" read -- thermocouple --; column 3, line 47, after "24" insert a comma; line 48, for "doted" read -- dotted --; column 7, line 32, strike out "the"; column 9, line 30, for "exceds" read -- exceeds --; line 38, for "and" read -- the --.

Signed and sealed this 31st day of January 1961.

(SEAL)
Attest:

KARL H. AXLINE                                      ROBERT C. WATSON
Attesting Officer                                 Commissioner of Patents